UNITED STATES PATENT OFFICE.

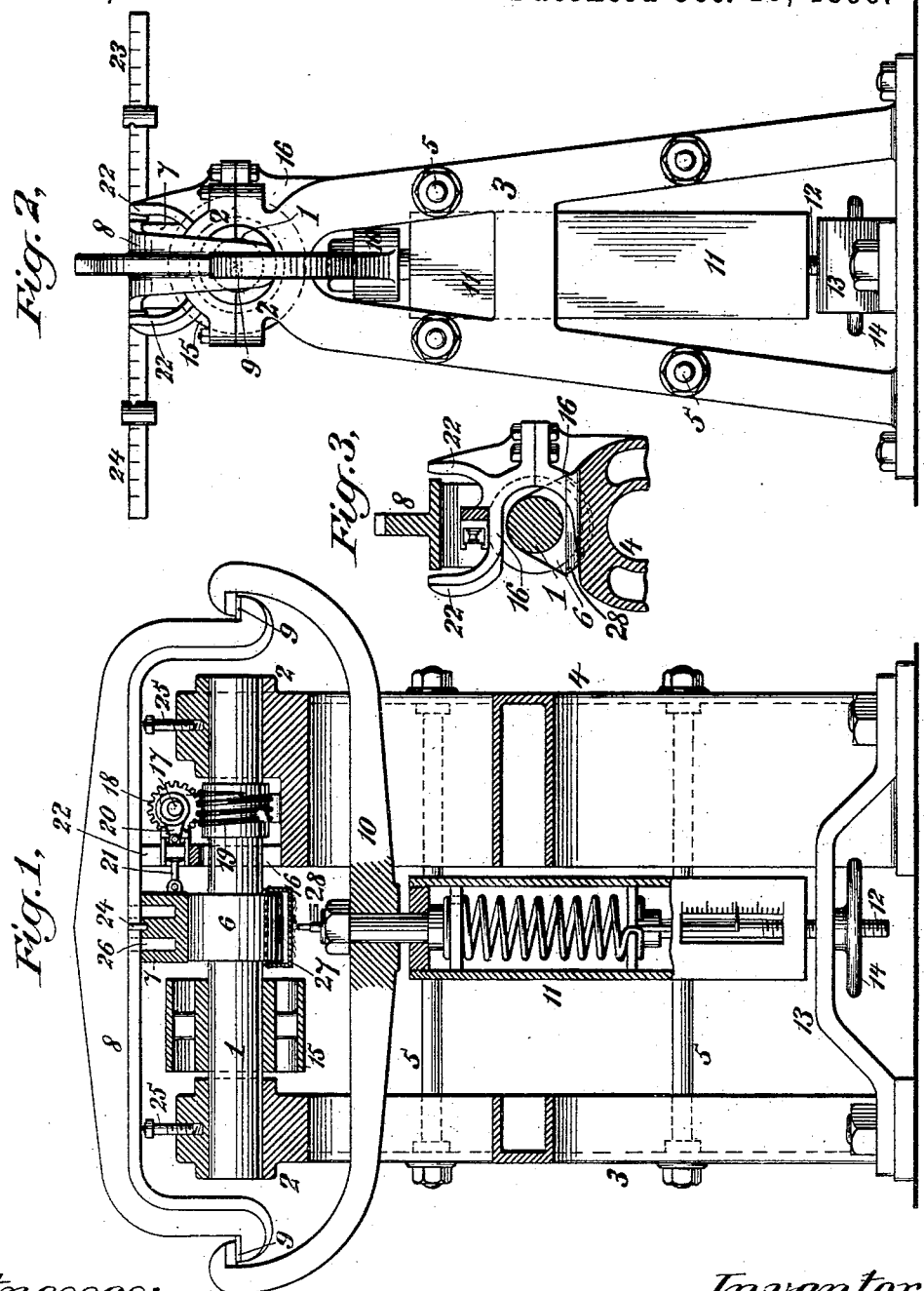

ROLLA C. CARPENTER, OF ITHACA, NEW YORK, ASSIGNOR TO TINIUS OLSEN, OF PHILADELPHIA, PENNSYLVANIA.

MACHINE FOR TESTING LUBRICANTS.

SPECIFICATION forming part of Letters Patent No. 569,407, dated October 13, 1896.

Application filed June 14, 1894. Serial No. 514,530. (No model.)

*To all whom it may concern:*

Be it known that I, ROLLA C. CARPENTER, a citizen of the United States, residing at Ithaca, in the county of Tompkins and State of New York, have invented certain new and useful Improvements in Machines for Testing Lubricants; and I do hereby declare the following to be a full, clear, and exact description of the invention, such as will enable others skilled in the art to which it appertains to make and use the same.

My invention relates to machines or apparatus for testing lubricants; and my invention consists in the novel means employed for keeping the lubricant supplied to the bearing constantly upon the working surfaces until it is worn out, thus preventing loss of the lubricant, and in the novel construction and arrangement of the various parts constituting the machine. In testing lubricants it is desirable to determine three characteristics of the lubricant under test—viz., first, the coefficient of friction at different temperatures, pressures, and speeds; second, the temperature produced by the friction, and, third, the endurance or wearing power of the lubricant when constantly at work. Frequently also it is desirable to determine these characteristics with various different metals for the bearing or friction surfaces. In machines heretofore constructed provision has been made for testing merely the coefficient of friction and the temperature produced, it being impossible to measure the endurance of the lubricant with accuracy, owing to the fact that the lubricant is continually thrown off from the friction-surfaces and thus prevented from doing further work. In former machines for this reason and in order to obtain uniform results it has been customary to keep the test-bearing flooded with the lubricant. In testing lubricants it is further desirable that the pressure between the test-journal and its bearing shall be applied in a manner similar to the manner in which pressure is applied to journals and bearings in most types of machinery. In most machinery it is the fact that but one side of a bearing presses against the journal at any one instant. In testing-machines heretofore constructed, however, the bearing of the test-journal presses against that journal from both sides at once, so that the conditions resulting are not, strictly speaking, analogous to those existing in practice.

The objects of my invention are, first, to provide a machine for testing lubricants in which it shall be possible to conduct tests with quantities of lubricant substantially the same as are ordinarily supplied to the journals of machinery under like conditions of speed and pressure; second, to provide means for retaining the lubricant upon the friction-surfaces and to prevent its escape therefrom, so that the lubricant may be used until its lubricating power is exhausted; third, to provide a machine in which the test journal shall receive pressure from but one side at once, thus conforming to the conditions existing in practice; fourth, to provide suitable means in a machine fulfilling the above conditions for varying the pressure upon the journal within desired limits, and, fifth, to make the construction of the machine simple, compact, durable, as inexpensive as possible, and to make the machine easy of manipulation. These objects are attained in the machine herein described and illustrated in the drawings which accompany and form a part of this application, in which the same reference-numerals indicate the same or corresponding parts, and in which—

Figure 1 is a central vertical section of my improved testing-machine. Fig. 2 is an end elevation thereof; and Fig. 3 is a detail view, in vertical transverse section, of the support used for the mechanism which reciprocates the bearing-block.

In the drawings, 1 is the main shaft of the machine, which is supported in bearings 2 2, formed in legs 3 and 4. These legs are braced and held together by tie-bolts 5 5. Upon the shaft 1 is a collar 6, forming the friction or test journal. Preferably it should be so secured to the shaft 1 that it may be removed therefrom readily and another collar substituted therefor. In this manner it is very easy to use upon the same machine journals of different sizes and of different materials, such as steel or wrought or cast iron.

Resting upon the upper surface of the journal is a bearing-block 7, which forms the other friction element of the machine. Above the block 7 is a yoke 8, the ends of which extend beyond the ends of the shaft 1 and are provided with horizontal steel bearing-plates 9 9. A second yoke 10 beneath the shaft 1 has upwardly-turned ends provided with knife-edges which rest upon these bearing-plates 9 9. These yokes 8 and 10 serve as a means for transmitting pressure to the bearing-block 7. The pressure may be obtained by hanging weights from the yoke 10, but is preferably obtained by using a spring-dynamometer 11, attached to the yoke 10, and the lower end of which is provided with a screw 12, passing through a bridge-plate 13, secured to the base of the machine. A hand-wheel 14 upon the screw 12 serves to vary the pressure exerted by the dynamometer, and a scale upon the dynamometer enables this pressure to be read at any instant. The bearing-block 7 may be integral with the yoke 8, but preferably should be separate therefrom but attached thereto by screws or similar means of attachment, so that bearing-blocks of different materials may be used in the same machine. The shaft 1 is rotated by means of a belt passing around a belt-wheel 15 on said shaft. The bearing-block 7 is slightly broader than the journal 6, and means are provided for moving the bearing-block across the face of the journal while the shaft is revolving, for the double purpose of distributing the lubricant over the face of the journal and for returning to the friction-surfaces any particles of the lubricant which may have escaped therefrom. This latter object is accomplished in the following manner: While the bearing-block presses against the journal there is a constant tendency to squeeze a portion of the lubricant out from between the bearing and journal, and the lubricant which escapes at the ends of the bearing-block will collect upon the ends of the journal. Since the bearing-block reciprocates across the face of the journal, first one edge and then the other of the journal will be uncovered momentarily. When an edge is thus uncovered, any lubricant which is upon that end of the journal will be forced by centrifugal action back upon the face of the journal. The bearing-block in its return movement then wipes up the lubricant thus collected, and upon the next movement of the block this lubricant is again restored to the friction-surfaces of the block and journal. In this manner none of the lubricant supplied to the test-bearing is wasted, but each particle is continually in use until its lubricating power is exhausted, that is, until the lubricant is worn out. It is therefore possible, by observing the time during which like quantities of different lubricants perform efficient service, to obtain accurate comparative measures of the endurance of different lubricants.

Various mechanisms may be employed for reciprocating the bearing-block, and I do not limit myself to the use of any particular mechanism. One mechanism, which is satisfactory and is shown in the drawings, is as follows: Projecting upward from the leg 4 is a bracket 16, preferably formed in two pieces, bolted together for convenience in removing the shaft 1 from the machine. Within this bracket is journaled a shaft 17, placed substantially at right angles to the main shaft 1 of the machine. Upon this shaft 17 is mounted a worm-wheel 18, which engages with a worm 19 upon the shaft 1. An eccentric on the shaft 17 communicates motion through links 20 and 21 to the bearing-block 7, suitable guides in the bracket 16 being provided for the link 21. Instead of the eccentric on the shaft 17 a wrist-pin projecting from the worm-wheel 18 may be used. Cam mechanisms for reciprocating the bearing-block may also be used. The movement thus imparted to the block 7 is very slight, so that but little power is required, and there is sufficient looseness in the various connections between the block 7 and the dynamometer to permit of this movement without tilting of the bearing-block 7. Inasmuch as the yoke 8 and block 7 necessarily swing somewhat about the axis of the shaft 1, owing to the friction between the bearing-block and the journal, the joints of the links 20 and 21 are made somewhat loose, so as to permit of some side motion of the block 7, and the bracket 16 is provided with upward projections 22 22, forming stops which engage with the sides of the yoke and prevent excessive movement thereof.

Projecting from the yoke 8, at right angles thereto, are two scale-beams 23 and 24, provided with sliding weights which serve to balance the yoke and bearing-block when the machine is in operation. If made alike in every particular, as is the case in the machine shown in the drawings, the machine may be run in either direction, one weight serving as a counterpoise to compensate for the initial friction of the bearing, and the other weight serving to measure the frictional moment due to the pressure applied. It is by the adjustment of these weights upon their scale-beams that the frictional moment, and therefore the coefficient of friction, is determined.

To facilitate the removal of the bearing-block 7 from the yoke 8, or to facilitate the cleaning of the journal and bearing-block, the bearings 2 2 of the legs 3 and 4 may be provided with screws 25 25, by which the yoke 8 may be lifted, so as to remove all pressure from the journal and lift the bearing-block clear therefrom. The block 7 is provided with recesses 26, which may be filled with oil or mercury and thermometers placed therein to observe the temperature of the bearing while the machine is in operation.

The operation of my improved testing-machine for lubricants is as follows: The journal and bearing-block 7 are first carefully cleaned by wiping with a cloth, but without using any substance, such as benzene, which will cut the oil. A very small known quantity of the oil to be tested is then applied to the journal and distributed over its surface. The bearing-block 7 is then brought into contact with the journal, the weights on the scale-beams 23 and 24 are placed at equal distances from the center, so as to balance each other, and the shaft 1 is caused to revolve at the desired speed. The slight initial friction will cause the block 7 and yoke 8 to swing about the axis of the shaft 1 as a center, the stops 22 preventing the yoke from swinging too far. The yoke is then brought back to the vertical position by balancing it against this initial friction by means of one of the scale-weights, and this weight is then allowed to remain where it is thus placed, the subsequent balancing of the yoke being effected by the other weight. By turning the hand-wheel 14 the pressure upon the journal at which it is desired to conduct the test is obtained and the weight upon the other scale-beam is moved until the yoke 8 is again vertical, the coefficient of friction being deduced from the moment required to balance the yoke against the frictional moment. By placing thermometers in the recesses 26, previously filled with oil or mercury, the temperature produced by the friction may likewise be measured. As the test progresses and the lubricant becomes worn the temperature will rise and the coefficient of friction will become greater, until eventually one or the other of these elements, temperature or coefficient of friction, will reach a value indicating that the lubricant is exhausted or is so nearly exhausted as to be no longer efficient and the test may then be discontinued. During the operation of the machine the bearing-block 7 is continuously reciprocated across the face of the journal by the worm-wheel and links connected therewith, thus distributing the lubricant over the friction-surfaces and insuring uniformity of results and at the same time returning to the friction-surfaces any particles of the lubricant which may have temporarily escaped therefrom.

If desired, my machine may be used for testing lubricant with flooded bearings by supplying the lubricant to the journal continuously and in large quantities through an oil-hole in the bearing-block 7 or by immersing the journal in a vessel filled with oil; but I believe that for most purposes the most valuable results are obtained by testing small quantities of lubricant to exhaustion, since the conditions then existing are more nearly analogous to those existing in most types of machinery.

If it is desired to artificially heat the journal while conducting the test, something that is sometimes desirable, a shield or plate 27 may be hung by wires or cords from the shaft 1 beneath the journal and a burner 28 used for heating this plate and so the journal.

Having thus completely described my invention, what I claim, and desire to secure by Letters Patent, is—

1. In a testing-machine for lubricants, the combination, with a revolubly-mounted shaft, and a journal thereon having a diameter greater than the adjacent portions of said shaft, of a bearing-block bearing against said journal and a frame for holding said block in place upon said journal, arranged to permit said block to reciprocate across said journal, whereby, when said block is reciprocated, lubricant which has escaped from the bearing-surfaces is restored thereto, substantially as described.

2. In a testing-machine for lubricants, the combination, with a revolubly-mounted shaft and a journal thereon having a diameter greater than the diameter of adjacent portions of said shaft, of a bearing-block bearing against said journal, and means for automatically reciprocating said block across said journal whereby, when said block is reciprocated, lubricant which has escaped from the bearing-surfaces is restored thereto, substantially as described.

3. In a testing-machine for lubricants, the combination, with a revolubly-mounted shaft and a journal thereon having a diameter greater than the diameter of adjacent portions of said shaft, of a bearing-block pressing upon one side of said journal, the other side of said journal having no bearing thereon, a frame for holding said bearing-block in place upon said journal, arranged to permit said block to reciprocate across said journal, whereby, when said block is reciprocated lubricant which has escaped from the bearing-surfaces is restored thereto, means for pressing said bearing-block against said journal, and means for measuring the frictional moment produced by the friction of said bearing-block against said journal, substantially as described.

4. In a testing-machine for lubricants, the combination, with a revolubly-mounted journal, of a bearing mounted upon knife-edges in line with the axis of said journal, and scale-beams projecting from said bearings at right angles to the journal, and having weights thereon for measuring the frictional moment, substantially as described.

5. In a testing-machine for lubricants, the combination, with a revolubly-mounted journal, of a bearing mounted upon knife-edges in line with the axis of said journal, scale-beams projecting from said bearings at right angles to the journal, and having weights thereon for measuring the frictional moment, and means for regulating the pressure of the bearing upon the journal, substantially as described.

6. In a testing-machine for lubricants, the combination, with a revolubly-mounted shaft, and a journal thereon, of a bearing upon said journal, a yoke connected therewith, a second yoke connected with said first-named yoke by frictionless connections, and pressure-exerting devices connected with said second yoke and adapted to cause said bearing to press against said journal, substantially as described.

7. In a testing-machine for lubricants, the combination, with a revolubly-mounted shaft, and a journal thereon, of a bearing upon said journal, a yoke connected therewith, a second yoke connected with said first-named yoke by frictionless connections, and a spring dynamometer connected with said second yoke and adapted to cause said bearing to press against said journal, substantially as described.

8. In a testing-machine for lubricants, the combination, with a revolubly-mounted shaft, and a journal thereon, of a bearing upon said journal, a yoke connected therewith, a second yoke, and knife-edge connections between said yokes, and a spring-dynamometer with said second yoke and adapted to cause said bearing to press against said journal, substantially as described.

9. In a testing-machine for lubricants, the combination, with a shaft revolubly mounted, a journal upon said shaft, and a bearing upon said journal, of a worm-gearing or equivalent mechanism engaging with said bearing and adapted to cause the same to reciprocate, substantially as described.

In testimony whereof I affix my signature in presence of two witnesses.

ROLLA C. CARPENTER.

Witnesses:
PATRICK DUSEILL,
WM. HAZLITT SMITH.